Jan. 21, 1936.  B. M. CARTER  2,028,318
PURIFICATION OF GASES
Filed Feb. 3, 1931  3 Sheets-Sheet 2

INVENTOR
B. M. Carter
BY
ATTORNEY

Patented Jan. 21, 1936

2,028,318

UNITED STATES PATENT OFFICE 2,028,318

PURIFICATION OF GASES

Bernard M. Carter, Montclair, N. J., assignor to General Chemical Company, New York, N. Y., a corporation of New York Application February 3, 1931, Serial No. 513,123

16 Claims. (Cl. 23—178)

This invention relates to a method and apparatus for the purification of burner gas such as is produced from sulfur or sulfide ores and other materials used in the manufacture of sulfuric acid, and especially to a purification process which will render such gas suitable for the manufacture of sulfuric anhydride and of sulfuric acid by the so-called contact process in which the sulfur dioxide content in such gas is caused to combine with oxygen by catalytic action, particularly when platinum is used as the catalyst.

In prior processes for the wet purification of burner gases effected in apparatus comprising generally sulfur burners, wet cooling towers and coke filters, the amount of evaporated moisture introduced into the burner gas in the wet cooling towers is much in excess of that needed to combine with the sulfuric anhydride or sulfuric acid contained in the burner gases for their deposition in the coke filters. Consequently, in processes such as that disclosed in U. S. P. 940,595 to Herreshoff, the liquid separated from the gas stream in the coke filter contained moisture to so great an extent that such liquid was too dilute for subsequent concentration, with the result that whatever acid was separated from the gas as mist was necessarily a loss. To avoid this entire loss, the process described in the United States patent to Herreshoff No. 1,113,437 was proposed, according to which a cooler was placed in the gas line between the wet cooling tower and the filter. This cooler effected the condensation of a large part of the moisture in the gas, thus facilitating the removal of moisture therefrom at least to such an extent that the liquid drawn off from the coke filter could be passed to the cooling tower. According to the practice of this prior process, the entire condensate from the cooler was turned to waste, and although in many instances the sulfuric acid loss was small, i. e. where conversion of sulfur dioxide to sulfur trioxide was small, in many other cases the acid condensed in the cooler and discarded with the liquid amounted to from 3 to 5% of the total output of the plant. Where the acid loss has been comparatively large, attempts have been made to save such acid by recirculating through the cooling towers. The objection to this has been the formation of a closed circuit which resulted in the gradual increase in the amount of impurities in the system, and afforded no outlet for such impurities as were poisonous to the catalytic material in the succeeding conversion apparatus. This has been particularly objectionable where the sulfur dioxide gases contained relatively large amounts of impurities such as fluorine and hydrochloric acid gas. In cases where impurities of this character have been present, it has been necessary to throw away the condensate from the coolers regardless of its acid content in order to avoid deleterious effects on the catalyst in the converters.

The present invention is directed to a process for cooling and purifying burner gases containing impurities such as fluorine and hydrochloric acid which are poisonous to the catalyst used in the conversion system, and particularly to the cooling and purification of gases containing fluorine compounds. Accordingly, it is the primary object of the present invention to provide a process for cooling and purifying burner gas containing fluorine by which substantially all the fluorine compounds may be eliminated from the gas, and by which a large portion of the dilute acid heretofore necessarily discarded because of contamination of fluorine compounds may be saved. The more specific objects of the invention comprehend the provision of a process by which moisture is condensed out of the gas in stages in such manner that a relatively large proportion of the deleterious fluorine compounds and other impurities are condensed out in one stage, and by which the liquid condensed out in a succeeding stage contains dilute sulfuric acid sufficiently free from impurities to permit subsequent recirculation and concentration of such liquid and contained sulfuric acid in the wet cooling towers. A further object of the invention resides in the provision of suitable apparatus for carrying out the improved process.

The invention briefly comprises contacting a hot burner gas to be purified with a stream of sulfuric acid, whereby the gas is cooled and substantially all the solid impurities removed therefrom. The partially cooled gas is then subjected to further cooling in successive stages in such manner that the condensate from the first stage contains a relatively large proportion of deleterious impurities particularly fluorine compounds, and the condensate from a succeeding stage contains a relatively large proportion of condensed sulfuric acid and is largely free from fluorine compounds to an extent such that the condensate may be turned back into the system, and the acid content thereof concentrated to commercial strength.

Herein is described one particular embodiment of the invention, but it will be understood that the specific procedure described and apparatus disclosed may be varied considerably without departing from the scope of the invention defined by the appended claims.

Referring to the drawings.

Figure 1:
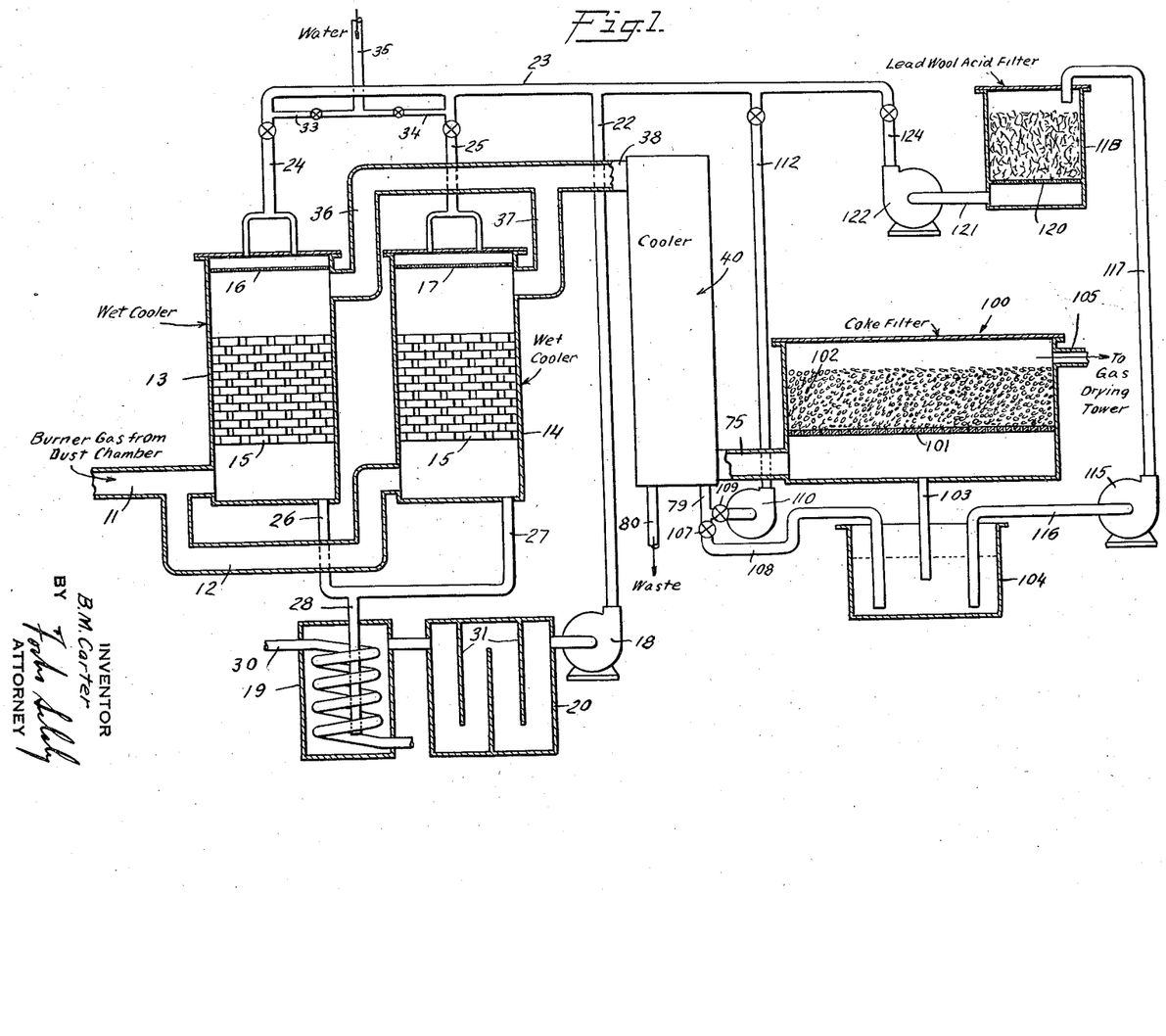
Fig. 1 is a diagrammatic illustration, partly in section, showing a plant in which the present process may be carried out.

In carrying out the invention, hot burner gases produced by the combustion of sulfurous material, such as brimstone or pyrites with air either with or without a partial precipitation of dust particles in suitable dust chambers, are conducted through the inlets 11 and 12 to the wet cooling or scrubbing towers 13 and 14. The gas entering the cooling towers is normally at a temperture of about 650 to 1000° F. The towers 13 and 14 are of suitable acid-proof construction, and may be entirely open or partially packed. Preferably, the lower half of each tower is provided with checkerwork 15 of acid-proof brick, such arrangement increasing the efficiency of the gas-liquid contact in the towers.

Near the top of each tower are located spray heads 16 and 17 directed downwardly, and designed to inject the cooling fluid into the tower in a high degree of dispersion. The use of sprays is preferable because of the intimate contact brought about between the liquid and the gas and by this means, thus providing more favorable conditions for evaporation of water vapor. Other devices for causing an intimate contact between the liquid and the gas in the towers may be employed, for example such as a relatively high tower filled with porous packing material.

The circulation of the cooling fluid through the towers 13 and 14 is maintained by the pump 18. Prior to the initiation of the cooling process in towers 13 and 14, the cooling tank 19 and the settling box 20 are filled with comparatively weak sulfuric acid, of a concentration ranging from about 40 to about 50° Bé. The pump 18 is started up, and acid is withdrawn from the settling box 20, and pumped through the vertical conduit 22 connected at its lower end to the outlet side of the pump 18 and at its upper end to the main acid inlet pipe 23. As indicated in the drawings, the acid inlet pipe 23 is connected to the sprays 16 and 17 through valve-controlled connections 24 and 25. After the liquid passes through the towers it is withdrawn therefrom through outlet pipes 26 and 27, and discharged into the lower end of the cooling tank 19 through a pipe 28. Cooling of the heated acid in tank 19 is effected by circulating any suitable cooling medium through the coil 30. The acid flows from the upper end of the cooling tank 19 into the upper part of the settling box 20 provided with baffles 31, the purpose of which is to effect a settling out of the solid impurities from the acid before the latter is recirculated through the cooling towers. In order to provide means for introducing water into the circulating system, when desired the valve-controlled water inlets 33 and 34 are connected to some source of water supply through the pipe 35.

After having passed upwardly through the cooling towers 13 and 14, the cooled and scrubbed gases leave the towers through the outlets 36 and 37, and are thence united in a single conduit 38 leading into the head of a cooler. The reference numeral 40 indicates generally a cooler which is shown diagrammatically in Fig. 1, and in perspective in Fig. 2.

Figure 2:
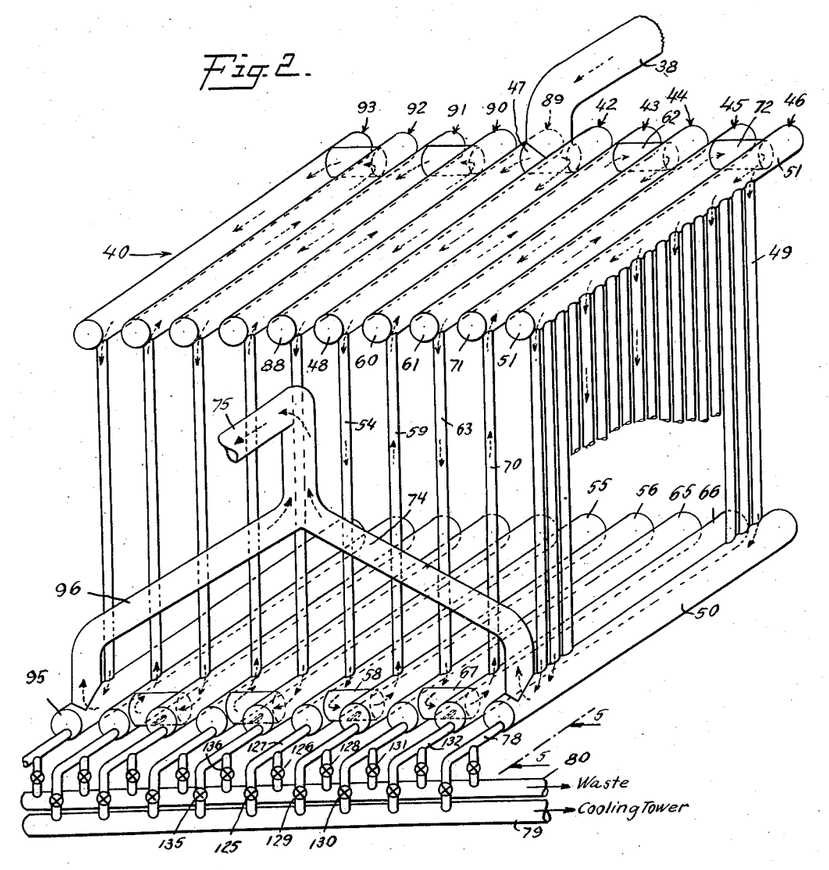
Fig. 2 is a perspective view of a cooler constituting one feature of the invention.
Figure 3:
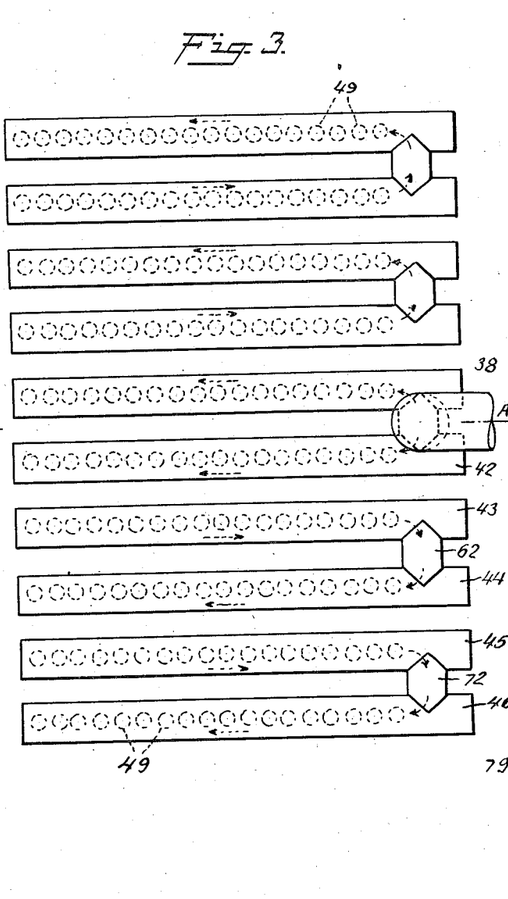
Fig. 3 is a plan view of the upper headers of the cooler.
Figure 4:
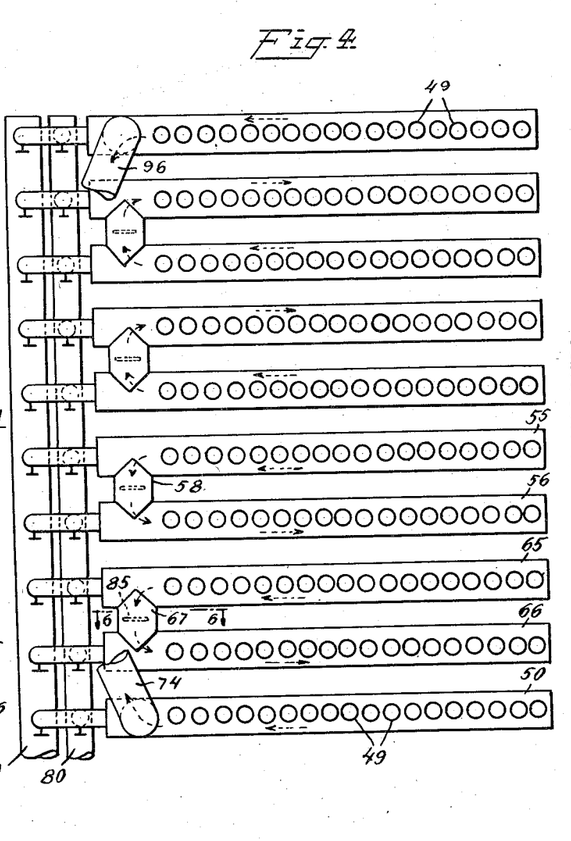
Fig. 4 is a plan view of the lower headers of the cooler.

It will be seen from an inspection of Fig. 2, that the cooler or condenser comprises a series of vertically disposed sets of cooling tubes having interconnected upper and lower headers. The apparatus shown in Fig. 2 is, in effect, a double cooler, but for the purpose of simplifying the description, only the right unit of the cooler will be described in detail, the right half of Fig. 2 corresponding to that portion of the cooler which is shown in Fig. 3 below the line A—A.

The right-hand unit of Fig. 2 comprises five vertically disposed coolers indicated generally by the reference numerals 42, 43, 44, 45 and 46. The main inlet conduit 38 of the cooler discharges into a cross-pipe 47 one end of which is connected to the rear end of the upper header 48 of the cooler 42. The construction of the individual coolers 42, 43, 44, 45 and 46 will be clearly understood from a brief consideration of cooler 46. The cooler 46 comprises a series of vertically disposed tubes 49 which at their lower ends are set into a lower header 50 and at their upper ends are connected into an upper header 51. Both ends of the upper header 51 are closed, and the rear end of the lower header 50 is likewise closed. The forward end of the lower header 50 is connected to condensate outlet pipe, the purpose of which will hereinafter more fully appear. The construction of each of the vertically disposed sets of cooling tubes is the same as that described in connection with cooler 46, and for the purpose of clearness in the drawing, only the forward vertical tubes of each of the coolers 42, 43, 44 and 45 is shown.

The gas entering the upper header 48 from the inlet 38 leaves the header 48 and passes downwardly through the tubes 54 of the cooler 42. The lower ends of the tubes 54 are set into the lower header 55. The forward end of the lower header 55 is connected to the forward end of the lower header 56 of cooler 43 by a cross-connector 58. As the rear end of the lower header 55 is closed, all the gas entering the header 55 leaves the same through the cross-connector 58, and enters the forward end of the lower header 56. The rear end of the lower header 56 is closed, and hence the gas passes upwardly through the vertical tubes 59 of the cooler 43, which tubes are connected to the upper header 60 of the cooler 43.

The rear end of upper header 60 is connected to the rear end of upper header 61 through a cross-connector 62. The forward end of header 61 is closed, and consequently the gases pass downwardly through the vertical tubes 63 of the cooler 44, the lower ends of which tubes lead into the lower header 65. The forward end of header 65 and the forward end of the adjacent lower header 66 are connected by a cross pipe 67. The rear end of lower header 66 is closed, and the gases are therefore caused to pass upwardly through the vertical tubes 70 which are connected to the underside of the upper header 71 of the cooler 45. The forward ends of headers 71 and 51 are closed, and the rear ends of these headers are connected by conduit 72. The gases pass downwardly from header 51 through the tubes 49 into the lower head 50 of the condenser 46.

Figures 5, 7:
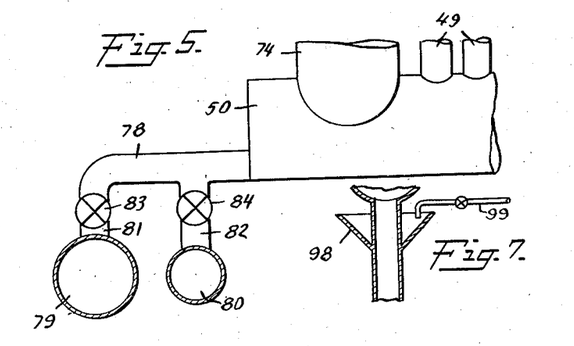
Fig. 5 is a fragmental elevation of the outlet end of one of the lower headers taken approximately on the line 5—5 of Fig. 2.
Fig. 7 is a detail in section of the upper end of one of the cooler tubes.

The right branch 74 of the Y-outlet pipe is connected at its lower end to the forward end of the lower header 50 as clearly shown in Fig. 5. The branch 74 conducts the outgoing gas in the right-hand cooler unit into the main outlet 75 of the cooler.

Liquids condensed during the passage of the gases through the vertical tubes in the several condensers flow downwardly along the sides of the vertical tubes and collect in the lower headers. The condenser is so constructed and supported that the forward ends of the headers are slightly lower than the rear ends so as to effect a flow of condensate toward the forward end of the cooler. The arrangement for withdrawing condensed liquids from the several lower headers is clearly indicated in Fig. 5. A liquid outlet pipe 78 of suitable cross-section is set into the forward end of the lower header 50. The outlet pipe 78 is connected to the draw-off mains 79 and 80 through short cross connections 81 and 82 having therein control valves 83 and 84. From a consideration of Fig. 5, it will be seen that when valve 84 is closed and valve 83 is open, liquid flowing from the lower header 50 passes through the pipe 78 and connection 81, and into the outlet main 79. Correspondingly, when the valve 83 is closed and the valve 84 is open, the liquid withdrawn from header 50 is conducted into outlet 80. As clearly shown in Fig. 2, the forward end of each lower header in both the right and left cooling units is provided with a pipe connection 78 by which the liquid collecting in any one of the lower headers may be conducted selectively into the outlet mains 79 or 80.

Figure 6:
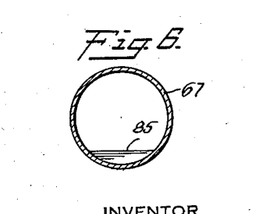
Fig. 6 is a vertical section on the line 6—6 of Fig. 4.

For a purpose which will hereinafter appear, it is desirable to maintain separate the liquids condensing in each of the several coolers. To effect this, each lower cross-connector is provided on the interior thereof with a dam 85 which is high enough to prevent the flow of liquid from one lower header to another, but which is low enough so as not to interfere with the passage of the gas through the connector. The arrangement of the dams 85 in each of the lower cross-connectors is clearly illustrated in Fig. 6.

Referring briefly to the left-hand unit of Fig. 2, that is to the portion of Fig. 2 which in Fig. 3 is represented as being above the line A—A, it will be apparent from Fig. 2 that the remote end of the cross-connector 47 is connected to the rear end of the upper header 88 of the cooler 89. The left cooling unit comprises five coolers indicated generally by the reference numerals 89, 90, 91, 92 and 93 which are in all respects duplicates of the coolers 42, 43, 44, 45 and 46, and are similarly arranged. The forward end of the lower header 95 of cooler 93 is connected to the left branch 96 of the Y-outlet pipe conducting the outgoing gas from the left cooler unit into the main outlet 75.

Referring again to the right cooler unit, the passage of the gas therethrough from the inlet 38 to the outlet connection 74 is briefly as follows. The gases enter the upper header 48 from the right end of the cross-connector 47. The gases pass downwardly through the vertical tubes 54 into the lower header 55. The rear end of the lower header 55 is closed, and consequently the gases must leave the header through the cross-connector 58, and thus enter the forward end of the lower header 56. The rear end of the lower header 56 is likewise closed, and thus the gas is caused to pass upwardly through the vertical tubes 59 of the cooler 43 and thence into the upper header 60. The forward end of the upper header 60 is closed, and hence the gases pass through the cross-connector 62 into the rear end of the upper header 61 of the cooler 44. The gases then pass downwardly through the vertical tubes 63, and enter the lower header 65. The rear end of the header 65 is closed, and the gases are thus caused to pass through the cross-connector 67 into the forward end of the lower header 66, the rear end of which is closed. The gases then pass upwardly through the vertical tubes 70, through the upper header 71 and the cross-connection 72 and into the upper header 51 of the cooler 46. The gases then pass downwardly through the tubes 49 into the lower header 50, and leave the cooler unit through the branch connection 74 which conducts the gas into the main outlet conduit 75.

Passage of the gas through the left unit is similar to that described in connection with the right unit, and the gases entering the left unit through the remote end of the cross-connector 47 leave the left unit through the branch pipe 96.

The cooling of the gas as it passes through the several sections and tubes of the cooler may be hastened by any desired means. For example, as illustrated in Fig. 7, each vertical tube may be provided at its upper end with a funnel-like trough 98 into which water is constantly conducted through a valve-controlled inlet pipe 99. The water flows over the circumference of the funnel 98 and trickles down over the entire outer surface of each tube. The water may be collected in suitable troughs arranged longitudinally of each of the lower headers. Obviously other means may be employed for causing cooling liquid to flow over the outer surface of the cooling tubes. Longitudinal troughs may be mounted above each of the upper headers and arranged similarly to the funnel-like member 98 of Fig. 7 or in any other suitable manner in order to effect a continuous overflow of water downwardly over the outer surface of the tubes.

The gases leaving the cooler through the cooler outlet 75 are conducted into the lower end of the coke filter 100 which is of a construction well known in the art. The foraminous member 101 supports a body of coke or other suitable material of considerable depth. The purpose of the coke filter is to remove the sulfuric acid mist contained in the gases, and such mist in liquid form collects in the bottom of the filter 100, and is withdrawn therefrom through the outlet pipe 103 and drained into the collecting tank 104. The cooled and purified gases leave the coke filter 100 through the outlet 105, and are thence conducted through the usual drying towers before the gases are sent through the conversion system.

As will be understood from the subsequent description of the operation of the process, the liquid withdrawn from the cooler through the outlet main 80 is conducted to waste, whereas the liquid withdrawn from the cooler through the outlet main 79 is recirculated through the cooling towers 13 and 14. The latter condensate from the cooler 40 may be immediately turned back into the towers 13 and 14, or it may be mixed with the liquid withdrawn from the coke filter 100 and then returned to the towers 13 and 14. In the first instance where it is desired to return such liquid directly, the valve 107 in the pipe connection 108 is closed, and the valve 109 is opened so that the liquid is drawn from pipe 79 into the inlet side of the circulating pump 110. The outlet side of the circulating pump 110 is connected through the valve-controlled pipe 112 with the main acid inlet pipe 23. In instances where for any reason it is not desired to immediately re-circulate the liquid withdrawn from the condenser, the valve 109 is closed and the valve 107 is opened thus permitting the condensate from the condenser to flow through the pipe connection 108 into the collecting tank 104 wherein such liquid is mixed with the more or less dilute acid mixture draining out of the coke filter 100 through the outlet pipe 103.

The liquid collected in the tank 104 is conducted back to the cooling towers by means of the pump 115, the inlet side of which is connected to a pipe 116 having its lower end immersed in the liquid in the tank 104. Liquid pumped through the pipe connection 117 by the pump 115 is discharged into the upper end of the lead-wool acid filter 118. The construction of this filter is somewhat similar to that of the coke filter 100 and comprises a foraminous supporting member 120 on which is placed a layer of lead-wool of some depth to filter out impurities in the acid. The acid collecting in the lower end of the acid filter 118 is withdrawn therefrom through the pipe 121 by a suitable pump 122, and is thence pumped through the vertical valve-controlled riser pipe 124 into the main acid inlet pipe 23.

In carrying out the invention, a suitable gas containing say from 7 to 12% sulfur dioxide, oxygen and nitrogen and impurities is produced by the combustion of sulfurous material such as pyrrhotite, pyrites or brimstone with air in a suitable burner not shown in the drawings. Such burner gas is usually passed through a dust chamber in which a large percentage of the heavy dust particles settle out, and after passing through suitable pipe connections is admitted to the wet cooling towers 13 and 14 through the conduits 11 and 12. On entering the cooling towers, the temperature of the gases ranges from about 650° F. to 1000° F. When the plant is in operation, circulation of the acid through the cooling towers is maintained by the pump 18. The cooling acid passes downwardly through the towers, through the cooling tank 19 and the settling box 20, and is thence returned to the sprays 16 and 17 by the pump 18. The gases passing upwardly through the checkerwork in the cooling towers are brought into intimate contact with the downwardly flowing sulfuric acid, and are thus cooled and scrubbed and most of the solid impurities, some sulfuric acid and arsenic, and iron compounds are removed therefrom. The cooling of the gases in the towers effects the evaporation of the moisture contained in the weak washing acid, and hence the moisture content of the gases is substantially increased. On losing moisture, the cooling acid becomes concentrated, and a small portion, approximately 1 to 2% of the acid is withdrawn as a product through a suitable liquid seal not shown connected to the upper part of the settling box 20. After passing through the cooling towers, the gases leaving by the outlet conduits 36 and 37 and entering the cooler inlet 38 are cooled to within the range of approximately 200 to 300° F.

The gases on leaving the cooling towers contain appreciable quantities of sulfuric acid in the form of mist, and variable quantities of fluorine and arsenic impurities, all of which substances have a deleterious effect on the catalyst used for converting the gases to sulfuric anhydride. The amount of evaporated moisture introduced into the burner gases in the wet cooling towers is much in excess of that needed to combine with the sulfuric anhydride or sulfuric acid contained in the burner gases for their deposition in the coke filters. Consequently, where, according to the early practice, as in Herreshoff 940,595, the gases leaving the cooling towers were introduced directly into the coke filter, the sulfuric acid mist, and arsenic and fluorine compounds were removed from the gases in the coke filter, but the liquid withdrawn therefrom was so dilute and contained so much moisture, that it was not feasible to concentrate the acid contained in such liquid by returning the liquid to the cooling towers. This situation as previously mentioned, was subsequently remedied to a material extent as in Herreshoff 1,113,437, by inserting coolers for dry cooling the gas between the scrubbing towers and the coke filter in which coolers a large part of the moisture contained in the gases was condensed and eliminated from the system. On passing through the coolers, the temperature of the gases was reduced from about 200–300° F. to about 100° F., and a considerable part of the moisture contained in the gases was condensed out. In some cases, condensate from the coolers contained a comparatively small quantity of sulfuric acid, and in such instances it was possible to turn this condensate to waste without causing any substantial commercial losses. In numerous other situations, however, where gases being treated were of such nature as to contain substantial quantities of fluorine compounds, and where a comparatively high conversion of sulfur dioxide to sulfur trioxide took place in the apparatus between the initial oxidation of sulfur in the burners and the outlet of the wet cooling towers, the liquid condensed in the intermediate cooler between the wet cooling tower and the coke filter box contained sulfuric acid in such quantities as to amount to 4 to 5% of the total acid output of the plant. It is apparent that such a high loss of acid is of considerable commercial importance, and where this condition obtained, attempts were made to save the acid in the condensate from the cooler by returning such condensate to the scrubbing towers, and therein concentrating the sulfuric acid to commercial concentrations.

It will be apparent that where condensate from the cooler is returned to the cooling towers that there is effected a closed circuit by reason of which impurities contained in the condensate of the cooler are immediately turned back into the system. When the gases are of such nature as to contain fluorine as an impurity, it will be apparent that the fluorine content of the gases would soon be built up in the system to such an extent as to poison the catalyst in the converters of the conversion system. In order to avoid this increase in the fluorine content of the gases and to provide for the elimination of the same from the system, it has been necessary to reject all the condensate from the cooler, thus causing a loss of sulfuric acid of from 2 to 5% of the total acid output of the plant.

The present invention is based on the discovery that, where the cooling and condensation of the moisture in the bases is carried out in stages, the greater part of the fluorine compounds appear in the condensate from the first stage of cooling, which condensate contains little or no sulfuric acid, and that the condensate from the second stage of cooling contains only small amounts of fluorine compounds but does include substantially all of the sulfuric acid which is condensed out of the gases with the moisture. It will be seen, therefore, that because of this discovery, the cooling of the gases may be conducted in such manner that the condensate from the first stage contains substantially all of the objectionable fluorine compounds and very little, if any, sulfuric acid, and the condensate from the second stage contains only small amounts of fluorine compounds but does contain practically all of the sulfuric acid. According to the practice of the invention the condensate from the first stage of cooling may be rejected and turned to waste, and the condensate from the second stage may be returned to the cooling towers. This procedure effects the elimination from the system of the fluorine compounds and at the same time effects a saving of the greater part of the sulfuric acid which was formerly discarded along with the fluorine compounds.

This multi-stage separation of fluorine compounds and dilute sulfuric acid is effected in the cooler shown in Fig. 2. The hot gases leaving the wet cooling towers at temperatures of about 200 to 300° F. enter the dry cooler through the inlet conduit 38. For the purpose of illustration, it will be sufficient to consider only the cooling of the gases passing through one unit of the cooler, say for example through the right unit. Approximately half the gases entering the inlet 38 are conducted into the upper header 48 of the cooler 42. The gases then pass downwardly through the vertical tubes 54 to the lower header 55. During the downward passage of the gases through the tubes 54, condensation of the moisture in the gases is initiated. It will be observed that the temperature of the gases in the upper header 48 is at some maximum within the approximate range of 200 to 300° F., and that the cooling of the gases is progressive as the gases pass entirely through the cooler.

The liquids condensed in the tubes 54 drop downwardly into the lower header 55 and collect therein. As previously noted, the lower headers are pitched slightly toward the front end of the cooler so as to effect a flow of liquid in the lower headers toward the forward end of the cooler. Now it has been found that when operating with certain gases that the drips collecting in the lower header 55 contain the greater portion of the fluorine compounds in such gases, and very little sulfuric acid. It will be recalled that each cross-connector between the lower headers contains a small dam 85 which prevents the mixing of condensates collected in the adjacent headers. The dam 85 in cross-connector 58 prevents the flow of liquid from lower header 55 into the lower header 56. Inasmuch as the condensate of cooler 42 collecting in the lower header 55 contains a large proportion of the fluorine compounds and substantially no sulfuric acid, it will appear that this condensate may be rejected without an appreciable loss of sulfuric acid.

The withdrawal and rejection of the condensate of cooler 42, containing a large proportion of the fluorine impurities from the system, is effected by closing the valve 125 and opening the valve 126. It will appear that with this regulation of valves 125 and 126, the liquid flowing out of the forward end of the lower header 55 through the cross-pipe 127 is discharged into the outlet main 80, through which pipe the condensate is conducted to waste.

The gases containing the partially condensed moisture pass through the cross-connector 58 into the lower header 56 of the condenser 43. From the header 56, the gases pass upwardly through the vertical tubes 59, and enter the upper header 60. Moisture condensing during the passage of the gases through vertical tubes 59 drips downwardly into the lower header 56 and flows toward the forward end thereof. If the plant control shows that substantially all of the fluorine compounds have been removed during the passage of the gases through the tubes 54 of the cooler 42, and that the liquid condensate of the second cooler 43 contains no appreciable quantity of fluorine compounds, the condensate from the cooler 43, collecting in the lower header 56, may be returned to the cooling towers. To bring about the return of this condensate to the cooling towers, the valve 128 is closed, and the valve 129 is opened thus draining the condensate from the lower header 56 into the main 79 which, as shown in Fig. 1, is connected directly to the cooling towers through the pipe 112 or indirectly through the pipe 108 and the collecting tank 104.

The gases leaving the upper header of the cooler 43 pass through the cross-connector 62 into the upper header 61 of the cooler 44, and thence downwardly through the vertical tubes 63 into the lower header 65. Cooling of the gases and condensation of the contained moisture progresses with the passage of the gases through the cooler. Liquids condensing during the downward passage of the gases through the tubes 63 collect in the lower header 65, and are drained off into the outlet main 79 by closing the valve 131 and opening the valve 130. In a similar manner, the gases pass upwardly through the vertical tubes 70 of the cooler 45, and then downwardly through the tubes 49 of the cooler 46. The liquid condensing in each set of tubes is collected respectively in lower headers 66 and 50, and flowing toward the forward ends thereof, is drained into the outlet main 79 by suitable manipulation of the valves in the drawoff pipes 132 and 78.

By the time the gases enter the lower end of the branch 74, the temperature of the gases has been reduced to approximately 100° F., a temperature not substantially in excess of atmospheric temperature, and the great part of the excess moisture contained in the gas has been condensed out.

Under the control set up as described, based on the assumption that the gases being treated are of such nature that a large portion or all of the fluorine compounds are contained in the condensate collecting in the lower header 55 of the cooler 42, such condensate is withdrawn from the system through the drain pipe 127, valve 126 and conduit 80, and is turned to waste. The condensates from the lower headers 56, 65, 66 and 50 are all discharged into the conduit 79 and are returned to the cooling towers to serve the purposes of concentrating the acid contained in such condensates, to furnish additional liquid to dilute the acid circulated through the cooling towers, and to effect cooling of the burner gases passing therethrough.

The second portion of the gases entering the inlet 38 is conducted into the left cooling unit and passes successively through the coolers 89, 90, 91, 92 and 93. The moisture content of the gases is condensed in stages in the same manner as described in connection with the passage of the gases through the right unit. The condensate from the condenser 89, containing a large portion of the fluorine impurities, is drained into the waste pipe 80 by closing the valve 135 and opening the valve 136. The condensates from remaining coolers 90, 91, 92 and 93 are all drained into the main 79 and mixed therein with the similar acid condensates withdrawn from the right unit of the condenser. The gases leaving the outlet ends of both units are again united in the cooler outlet conduit 75, and conducted into the coke filter.

During the passage of the gases through the coke filter 100, the sulfuric acid mist is removed from the gases and drained into the tank 104. The temperature of the gases entering the filter being in the neighborhood of about 100° F., it will be seen that there is no further substantial cooling of the gases as they pass through the filter, that is, any incidental cooling which may be effected in the filter 100 is to be distinguished from the cooling in stages which takes place in the cooler 46. The acid collected in the tank 104 generally amounts to around 3 to 8% of the total acid output of the plant, and as a rule is of a concentration in the neighborhood of 20 to 22 Bé. The dilute acid in tank 104 is withdrawn therefrom by the pump 115, and delivered to the filter 118 through the pipe 117, and thence through pump 122 and pipe 124 into the acid inlet pipe 23. Thus, the dilute acid is mixed with the acid circulated through the towers 13 and 14, and is concentrated to commercial strength, the concentrated acid product being withdrawn from time to time in the necessary quantities from the settling box 20.

It will be apparent that the invention comprises a gas cooling process carried out in stages and under such temperature conditions that in the first stage, the large proportion of the fluorine impurities are included in the condensate, and in the second stage, the condensate contains substantially all the condensed sulfuric acid, and only small amounts of fluorine impurities, the condensate from the first stage being rejected and turned to waste and the acid condensate from the second stage being returned to the system. It has been assumed, for purpose of illustration, that the fluorine content of the gases and the control conditions are such that substantially all of the fluorine impurities are removed in the first cooler, namely, in the cooler 42. It will be apparent that while the cooling is carried out in two stages, there is no definite point for all conditions of operation at which the two stages of cooling are separated. For example, it may appear that the fluorine content of the drips collected in lower header 56 may be high, and that the sulfuric acid content is low. In this situation, the condensates from both the lower headers 55 and 56 would then be turned into the waste pipe 80 and rejected, and only the condensates from the condensers 44, 45 and 46 discharged to the conduit 79 for return to the cooling towers. In other words, the cooling is such that for any specific set of conditions there is a fairly definite line between the two stages of cooling, but that according to conditions encountered in practice this dividing line may vary, and in some instances operating conditions may be such that the condensate of cooler 42 is rejected, and under other conditions, the condensate of coolers 42 and 43 may be rejected, and in still other instances it may be desirable to also reject the condensate of cooler 44. It will be apparent, therefore, that necessarily the dividing line between the two stages of condensation is a variable one depending upon specific conditions encountered in practice.

In one situation where the invention has been employed in practice in connection with the purification of burner gases containing fluorine impurities, it was found that substantially all the fluorine impurities were contained in the liquid condensing in the cooler 42, and that the purposes of the invention were accomplished by rejecting this condensate, and returning the condensates from coolers 43, 44, 45, and 46 to the cooling towers for concentration. When operating with this particular gas, it was found that the sulfuric acid lost in the liquid rejected was less than 0.3%, that upwards of 85% of the acid drips in the cooler 49 were saved and that about 95% of the fluorine impurities were eliminated from the gas.

I claim:

1. The method of eliminating deleterious impurities from hot burner gases in the contact sulfuric acid process which comprises cooling the hot gas containing water vapor in stages to cause condensation of the water vapor together with impurities and sulfuric acid contained in the gas, separately collecting condensate from an initial and a subsequent stage of said cooling operation, discarding initial condensate while retaining subsequent condensate whereby impurities are eliminated from the system in the initial condensate, whereas sulfuric acid condensed from the gas is segregated in the subsequent condensate.

2. The method of eliminating impurities from hot burner gases in the contact sulfuric acid process which comprises cooling the hot gases containing water vapor to cause fractional condensation of the water vapor together with impurities and sulfuric acid contained in the gas, segregating the water initially condensed from that subsequently condensed and effecting the segregation at such point in the cooling operation that the initial condensate will contain a relatively large proportion of condensed impurities with but a relatively small proportion of sulfuric acid, whereas the subsequent condensate will contain a relatively large proportion of sulfuric acid with but a relatively small proportion of impurities, and discharging initial condensate from the process.

3. The process of cooling and purifying hot burner gas which comprises subjecting the gas to a wet cooling operation whereby the moisture content is increased by evaporation from the cooling liquid, and further cooling the gas in stages to condense the moisture therein under such conditions that the condensate from one stage contains a relatively high proportion of fluorine impurities with but a relatively small proportion of sulfuric acid, while the condensate from another stage contains a relatively high proportion of condensed sulfuric acid with but a relatively small proportion of impurities, segregating the condensates, and discharging from the process the fluorine impurities containing condensate.

4. The process of cooling and purifying hot burner gas which comprises contacting the burner gas with a stream of sulfuric acid whereby the gas is cooled, solid impurities removed therefrom, and the moisture content thereof increased, further cooling the gas in stages to condense the moisture therein under such conditions that the condensate from one stage contains a relatively high proportion of impurities with but a relatively small proportion of sulfuric acid, while the condensate from another stage contains a relatively high proportion of condensed sulfuric acid with but a relatively small proportion of impurities, segregating the condensates, and discharging from the process the condensate containing a relatively high proportion of impurities.

5. The process of cooling and purifying hot burner gas which comprises contacting the burner gas with a stream of sulfuric acid whereby the gas is cooled, solid impurities removed therefrom, and the moisture content thereof increased, further cooling the gas in stages to condense the moisture therein under such conditions that the condensate from one stage contains a relatively high proportion of impurities with but a relatively small proportion of sulfuric acid, while the condensate from another stage contains a relatively high proportion of condensed sulfuric acid with but a relatively small proportion of impurities, separately collecting the condensates, discharging from the process the condensate containing a relatively high proportion of impurities, and concentrating the acid in the second mentioned condensate.

6. The process of cooling and purifying hot burner gas which comprises contacting the burner gas with a stream of sulfuric acid whereby the gas is cooled, solid impurities removed therefrom, and the moisture content thereof increased, further cooling the gas in stages to condense the moisture therein under such conditions that the condensate from one stage contains a relatively high proportion of impurities with but a relatively small proportion of sulfuric acid, while the condensate from another stage contains a relatively high proportion of condensed sulfuric acid with but a relatively small proportion of impurities, separately collecting the condensates, discharging from the process the condensate containing a relatively high proportion of impurities, and returning the second mentioned condensate to the said stream of sulfuric acid.

7. The process of cooling and purifying hot burner gas which comprises contacting the burner gas with a stream of sulfuric acid whereby the gas is cooled, solid impurities removed therefrom, and the moisture content thereof increased, further cooling the gas in successive stages to condense the moisture therein, separately collecting the condensates of the successive stages, discharging from the process condensate condensing at the higher temperature, and returning the condensate condensing at the lower temperature to the said stream of sulfuric acid.

8. The process of cooling and purifying hot burner gas which comprises contacting the burner gas with a stream of sulfuric acid whereby the gas is cooled, solid impurities removed therefrom, and the moisture content thereof increased, further cooling the gas in stages to condense the moisture therein under such conditions that the condensate from one stage contains a relatively high proportion of fluorine impurities with but a relatively small proportion of sulfuric acid, while the condensate from another stage contains a relatively high proportion of condensed sulfuric acid with but a relatively small proportion of fluorine impurities, separately collecting the condensates, discharging the first mentioned condensate from the process, and concentrating the second mentioned condensate by contacting the same with hot burner gas.

9. The process of cooling and purifying hot burner gas which comprises contacting the burner gas with a stream of sulfuric acid whereby the gas is cooled, solid impurities removed therefrom, and the moisture content thereof increased, further cooling the gas in successive stages to condense the moisture therein, separately collecting the condensates of the successive stages, discarding the condensate condensing in the first stage, and returning the condensate from a succeeding stage to the said stream of sulfuric acid.

10. The process of cooling and purifying hot burner gas which comprises contacting the burner gas with a stream of sulfuric acid whereby the gas is cooled, solid impurities removed therefrom, and the moisture content thereof increased, further cooling the gas in two successive stages to condense the moisture therein, separating the condensates of the successive stages, discharging from the process condensate formed in the first stage, and returning the condensate from the second stage to the said stream of sulfuric acid.

11. The process of cooling and purifying hot burner gas which comprises contacting the burner gas with a stream of sulfuric acid to cool the gas to substantially within the range 200–300° F., further cooling the gas in successive stages to approximately 100° F. to condense moisture therein, separately collecting the condensates condensing out in the successive stages, discharging from the process condensate condensing at the higher temperature, and returning the condensate condensing at the lower temperature to the said stream of sulfuric acid.

12. The process of cooling and purifying hot burner gas containing fluorine impurities which comprises contacting the burner gas with a stream of sulfuric acid to cool the gas to substantially within the range 200–300° F., further cooling the gas in sucessive stages to approximately 100° F. to condense moisture therein, separating the condensates condensing out in the successive stages to give a condensate containing a relatively large proportion of fluorine impurities and a condensate containing a relatively large proportion of sulfuric acid, discharging from the process the first mentioned condensate, and contacting the last mentioned condensate with hot burner gas to concentrate the acid contained in such condensate.

13. The process of cooling and purifying hot burner gas which comprises contacting the burner gas with a stream of sulfuric acid to cool the gas to substantially within the range 200–300° F., further cooling the gas in stages to approximately 100° F. to condense the moisture therein and form a condensate containing a relatively small amount of sulfuric acid and a condensate containing a relatively large amount of sulfuric acid, returning the condensate containing the relatively large amount of sulfuric acid to the said stream of sulfuric acid, and discharging from the process the first mentioned condensate.

14. The process of cooling and purifying hot burner gas which comprises contacting the burner gas with a stream of sulfuric acid to cool the gas to substantially within the range of 200–300° F., whereby solid impurities are removed from the gas and the moisture content thereof is increased, further cooling the gas in two successive stages to approximately 100° F. to condense the moisture contained therein, separating the condensates condensing out in the successive stages, discharging from the process the condensate of the first stage, separating from the gas sulfuric acid contained therein in the form of mist, returning such separated acid and the condensate from the second stage to the said stream of sulfuric acid.

15. The process of cooling and purifying hot burner gas which comprises subjecting the gas to a wet cooling operation whereby the moisture content is increased by evaporation from the cooling liquid, and further cooling the gas in stages to condense the moisture therein under such conditions that the condensate from one stage contains a relatively high proportion of impurities with but a relatively small proportion of sulfuric acid, while the condensate from another stage contains a relatively high proportion of condensed sulfuric acid with but a relatively small proportion of impurities, segregating the condensates and discharging from the process the condensate containing a relatively high proportion of impurities.

16. The process of cooling and purifying hot burner gas which comprises subjecting the gas to a wet cooling operation at a temperature substantially above atmospheric temperature whereby the moisture content of the gas is increased by evaporation from the cooling liquid, then further cooling the gas by a dry cooling operation in successive stages to a temperature not substantialy greater than atmospheric temperature to condense moisture therein under such conditions that the condensate from one stage contains a relatively high proportion of impurities with but a relatively small proportion of sulfuric acid, while the condensate from another stage contains a relatively high proportion of condensed sulfuric acid with but a relatively small proportion of impurities, segregating the condensates, and discharging from the process the condensate containing a relatively high proportion of impurities.

BERNARD M. CARTER.